United States Patent
Aranzulla et al.

(10) Patent No.: US 8,955,879 B2
(45) Date of Patent: Feb. 17, 2015

(54) AIRBAG

(75) Inventors: Daniele Aranzulla, Essingen (DE);
Martin Burkhardtsmaier, Schwaebisch Gmuend (DE); Nico Werner, Heubach (DE); Tomasz Pys, Czestochowa (PL)

(73) Assignee: TRW Automotive GmbH, Alldorf (DE)

( * ) Notice: Subject to any disclaimer, the term of this patent is extended or adjusted under 35 U.S.C. 154(b) by 37 days.

(21) Appl. No.: 13/126,784

(22) PCT Filed: Nov. 16, 2009

(86) PCT No.: PCT/EP2009/008147
§ 371 (c)(1),
(2), (4) Date: Jun. 6, 2011

(87) PCT Pub. No.: WO2010/057607
PCT Pub. Date: May 27, 2010

(65) Prior Publication Data
US 2012/0098242 A1  Apr. 26, 2012

(30) Foreign Application Priority Data
Nov. 19, 2008  (DE) .......... 10 2008 057 968

(51) Int. Cl.
| | |
|---|---|
| *B60R 21/231* | (2011.01) |
| *B60R 21/205* | (2011.01) |
| *B60R 21/01* | (2006.01) |
| *B60R 21/235* | (2006.01) |
| *B60R 21/00* | (2006.01) |

(52) U.S. Cl.
CPC ..... *B60R 21/231* (2013.01); *B60R 2021/01238* (2013.01); *B60R 2021/23571* (2013.01); *B60R 2021/0048* (2013.01); *B60R 2021/23533* (2013.01)
USPC ........................................ 280/743.1; 280/732

(58) Field of Classification Search
CPC ................ B60R 21/205; B60R 21/231; B60R 2021/23538; B60R 2021/23533; B60R 2021/23576; B60R 2021/23571; B60R 2021/01238
USPC .................... 280/732, 743.1, 728.1
See application file for complete search history.

(56) References Cited

U.S. PATENT DOCUMENTS

| | | | |
|---|---|---|---|
| 3,792,873 A * | 2/1974 | Buchner et al. ............ | 280/743.1 |
| 5,316,337 A | 5/1994 | Yamaji et al. | |
| 5,529,340 A | 6/1996 | Fairbanks | |
| 6,361,073 B1 * | 3/2002 | Ortmann .................... | 280/743.1 |
| 7,073,818 B2 * | 7/2006 | Hasebe ........................ | 280/729 |
| 7,255,367 B2 * | 8/2007 | Bauer et al. ................ | 280/743.1 |
| 7,404,575 B2 * | 7/2008 | Bito et al. .................. | 280/743.1 |
| 7,758,069 B2 * | 7/2010 | Enders ........................ | 280/732 |
| 2002/0020998 A1 | 2/2002 | Keshavaraj | |
| 2004/0150200 A1 * | 8/2004 | Yamada et al. ............. | 280/732 |
| 2006/0214405 A1 | 9/2006 | Rose et al. | |
| 2006/0261579 A1 * | 11/2006 | Breed ......................... | 280/729 |

* cited by examiner

*Primary Examiner* — Keith Frisby
(74) *Attorney, Agent, or Firm* — Tarolli, Sundheim, Covell & Tummino LLP (57) ABSTRACT

An airbag, especially a passenger airbag, comprises a rear injection orifice, a front wall (14) for the impact of the occupant as well as two opposed sidewalls (16, 18) and an upper wall and a lower wall. Each of the upper and lower walls is split and consists of side portions (50, 52) which are juxtaposed and are connected to each other along opposite margins (40, 42).

13 Claims, 11 Drawing Sheets

AIRBAG

RELATED APPLICATIONS

This application corresponds to PCT/EP2009/00008147, filed Nov. 16, 2009, which claims the benefit of Germany Application No. 10 2008057 968.80, filed Nov. 19, 2008, the subject matter of which is incorporated herein by reference in their entirety.

TECHNICAL FIELD

The invention relates to an airbag, especially a passenger airbag, comprising a rear inflation orifice, a front wall for the impact of the occupant, two opposed sidewalls as well as an upper wall and a lower wall.

BACKGROUND OF THE INVENTION

In the case of airbags, depending on the interior dimensions and the contour of the adjacent surfaces (especially the instrument panel) airbags having different characteristics are employed. In the case of very plane surfaces and simple contours the so-called two-dimensional airbags adapted to be manufactured at lower cost are used. In the case of these airbags it is possible to manufacture the airbag of a one-piece cloth part which is then folded and sewed at the margins which are adjacent by folding. Those two-dimensional airbags are suited for rather simple contours, however, as mentioned already. What is important with the airbag is the fact that it can contact an adjacent vehicle part and can be backed by the same in the case of impact of the occupant.

It is moreover desirable that the seams are not thermally overloaded.

Hereinafter the term "seam" is preferably directed to margins which are in fact sewed up to each other, wherein this is not restrictive, however, as there already exist seams that are welded or glued to each other and they are equally supposed to be understood by "seam".

U.S. Pat. No. 5,316,337 provides an example of a so-called two-dimensional airbag.

Moreover, there are also the so-called three-dimensional airbags in which the airbag has a more complex outer contour in the inflated state and consists of plural individual parts sewed together, especially of two sidewalls and a strip-shaped circumferential central part connecting the sidewalls to each other so that kind of a roll is resulting which need not be circular-cylindrical, however, but may have any shapes depending on the geometry of the sidewalls. It is more difficult to sew such three-dimensional airbags, as the margins to be sewed up are not placed on top of each other by simply folding the airbag cloth.

SUMMARY OF THE INVENTION

The invention provides an airbag, especially a passenger front airbag, which can be manufactured very easily and inexpensively and which primarily excels by the fact that its design can be adapted very quickly to different interior contours. This adaptability is of great importance especially when it is attempted to optimize new vehicles, for completely new airbag designs considerably increase the expenditure on time and cost for optimizing the adjustment of the airbag to the interior.

This object is achieved by an airbag of the type described in the beginning in which each of the upper and/or lower walls are split and consist of juxtaposed side portions connected along opposed margins.

By splitting the upper wall and/or the lower wall, preferably along a central axis of symmetry, the geometry of the upper and lower walls can be varied in a very simple and efficient manner so as to adapt the airbag shape to the interior. In U.S. Pat. No. 5,316,337 it is not the upper and lower walls but the sidewalls that are composed of two portions. If, however, the geometry of the upper and lower walls and thus the airbag shape is to be varied in these areas, this is not possible or possible to a very restricted extent only.

In contrast to this, the side portions of which the upper and lower walls of the airbag according to the invention are composed can be adapted very quickly and easily by quite simply designing the respective margins in a different way.

Preferably, the connected margins of the side portions extend linearly viewed in the cut of the airbag.

On the other hand, a different embodiment provides that the margins do not extend linearly. In this case the margins extend outwardly arched, for instance, so that a curvature is formed. Thus an outwardly directed bulge is imparted to the airbag at its upper and/or lower walls. This bulge makes it possible that the upper and/or lower walls does not extend linearly, viewed in the side view of the inflated airbag, but gets sort of a kink by which the airbag can adapt to the contour of the instrument panel. In this way the bulge becomes sort of a direct support surface at the instrument panel. The corresponding airbag volume reduces a hollow space between the thighs of the average occupant and the vertical portion of the instrument panel which in the case of previous airbags was hardly filled. This resulted in the fact that in the event of restraint during impact of the occupant onto the airbag this space was initially filled by the fact that the airbag was pressed into the same before it could be backed by the largely vertically extending portion of the instrument panel.

The bulge is preferably located such that it projects, viewed in a side view of the inflated airbag, into a triangle which is formed by the front face of the instrument panel and the thighs of the average occupant. When hereinafter the "average occupant" is mentioned, this is a standardized so-called 50 percent dummy.

According to another embodiment, the bulge is located especially such that it contacts the thighs of the average occupant.

Another embodiment provides that the lower wall, viewed in a side view of the inflated airbag, includes two portions, namely a largely horizontal portion for contact with the thighs of an average occupant and a more or less upwards slanting portion for backup by the front face of the instrument panel. The front face especially extends vertically at least in portions.

If it turns out in the constructional design of the airbag that the juxtaposed margins of the upper and lower walls of the airbag extend at least approximately linearly, the two associated pieces of cloth can also be manufactured in one piece. Both the upper wall and the lower wall can be formed in one piece. This is primarily dependent on the neighboring interior geometry of the vehicle, especially of the outer contour of the instrument panel and, resp., the inclination and curvature of the windscreen. The two straightly extending margins are then manufactured by weaving so that a sewing operation can be saved and no seam allowance has to be provided in the cut. The respective piece of cloth is then sewed up along the two margins positioned in the upper and lower walls and subsequently with the front wall.

A further improved adaptation to the geometry of the instrument panel is achieved by the use of an additional elongate cloth part which is inserted in the lower wall between the two neighboring margins. This elongate cloth part advantageously has a slightly bulged shape by which an improved backup by the instrument panel in the inflated airbag. Such airbag substantially consists of four main cloth parts, a front wall, the two sidewalls including the side portions forming the upper and lower walls and the additional cloth part inserted between the two lower side portions.

The airbag according to the invention especially is a large-volume airbag, i.e. not a knee or side airbag, but an airbag having a large volume of between 70 and 130 liters, preferably 110 liters.

The sidewalls are preferably configured to be seamless. This means that the sidewalls consist of one single cloth portion or cloth part.

A "cloth part" is a separate, cut one-piece cloth part, whereas a "cloth portion" is either a complete cloth part or a portion of a cloth part.

Inside the airbag in the area of the injection orifice a so-called gas deflecting means is preferably provided in passenger airbags. Such gas deflecting means especially is a separate cloth strip extending around the inflator like a roll against which the inflator directly blows. The cloth roll is open at the side so that the gas is deflected to the side. This embodiment is especially advantageous in connection with seamless sidewalls, for in this case no seams directly exposed to hot gas are provided in the area of the sidewalls any more.

Each sidewall including its adjacent upper and lower side portions is preferably designed as a one-piece cloth portion, especially also as a separate one-piece cloth part.

The one-piece cloth portion is tapered toward the associated portion of the injection orifice periphery. The periphery of the injection orifice is composed of plural, more exactly speaking of two halves. The cloth portion is tapered toward this half of the injection orifice periphery which is defined by the one-piece cloth portion.

The injection orifice periphery, more exactly speaking the half of the injection orifice periphery associated with the cloth portion, is preferably formed by a V-shaped indentation in the cloth portion.

Viewed in the cut of the airbag, the margins of a side portion which are mounted to an upper margin and a lower margin of the front wall as well as the margins of this (first mentioned) side portion to be connected to the respective opposite side portion can be tapered toward each other forming a triangle. In this case, too, possibly a triangle in the broadest sense is formed.

This triangle can also be in the form of a separate cloth part or of a portion of the cloth part.

An embodiment of the invention provides that the airbag consists of a one-piece cloth part, i.e. a coherent one-piece cloth layer.

If the airbag according to the invention is composed of several parts, a reduced waste of cloth can be realized.

Viewed in the cut of the airbag, the cloth part or parts has/have a centric axis of symmetry. If plural cloth parts together form the airbag cut, they should be positioned to be adjacent to each other, namely in the position in which the airbag orifice periphery portions form the lateral outermost portions and the central portion for forming the front wall contacts the lateral cloth parts.

Viewed in the cut of the airbag, the airbag includes a centric cloth portion for forming the front wall and two outer cloth portions (or cloth parts) extending opposite to the injection orifice peripheries which are slanting starting from the centric cloth portion first upwards and downwards to uppermost and lowermost corner points and from these outwards and inwards to the injection orifice peripheries. There is resulting sort of a bat contour having a centric body which in the axial direction is shorter than the "wings".

Further features and advantages of the invention can be inferred from the following description and from the following drawings which are referred to and in which:

BRIEF DESCRIPTION OF THE DRAWINGS

FIGS. 16-1 and 16-2 illustrate a second survey of various options of the cut of the airbag according to the invention with the cut variants 16a to 16l.

DESCRIPTION OF EMBODIMENTS

Figure 1:
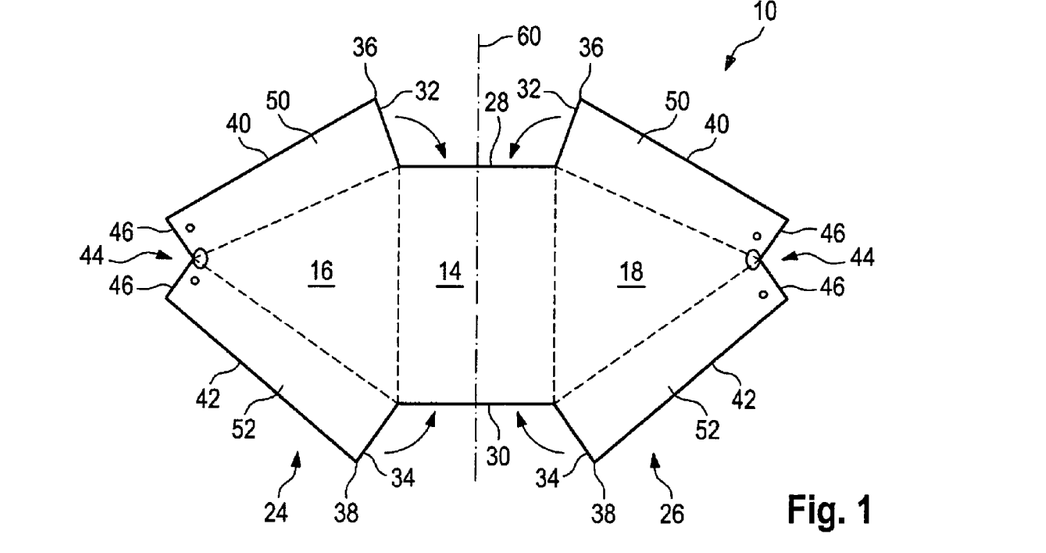
FIG. 1 shows a top view of the cut of an airbag according to the invention, in this case an airbag having one single cloth part.

In FIG. 1 the cut of a so-called two-dimensional airbag for a passenger is illustrated, the airbag being accommodated in the instrument panel and being designed for a head-on impact.

Figure 9:
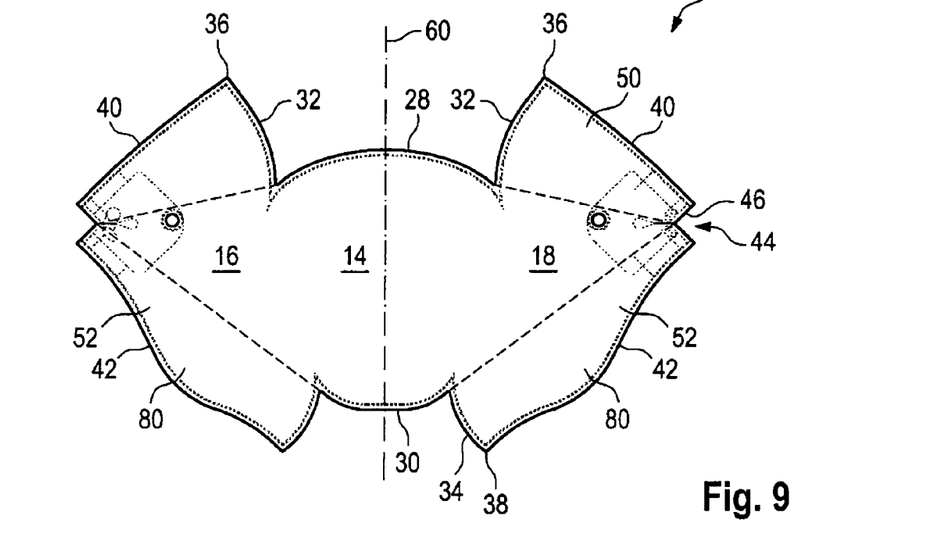
FIG. 9 shows a cut of an airbag according to the invention in accordance with a third embodiment, in this case as airbag including a one-piece cloth part.
Figure 12:
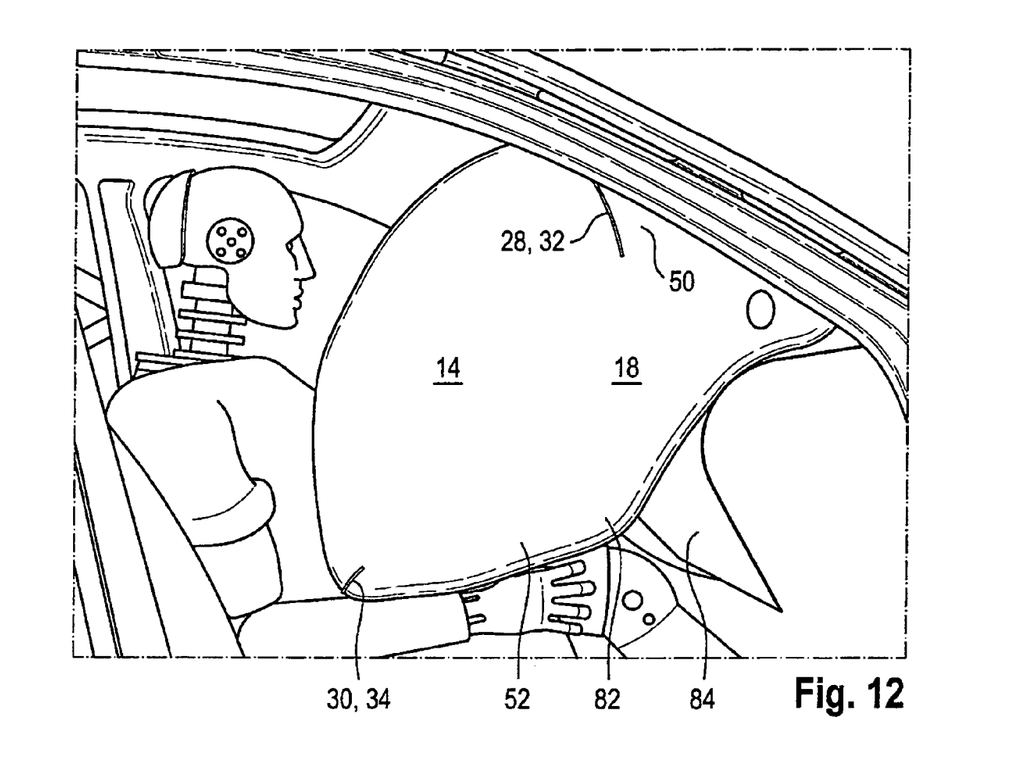
FIG. 12 shows a side view of the airbag according to the invention in accordance with FIG. 9 in the inflated state with a 50 percent dummy.
Figure 13:
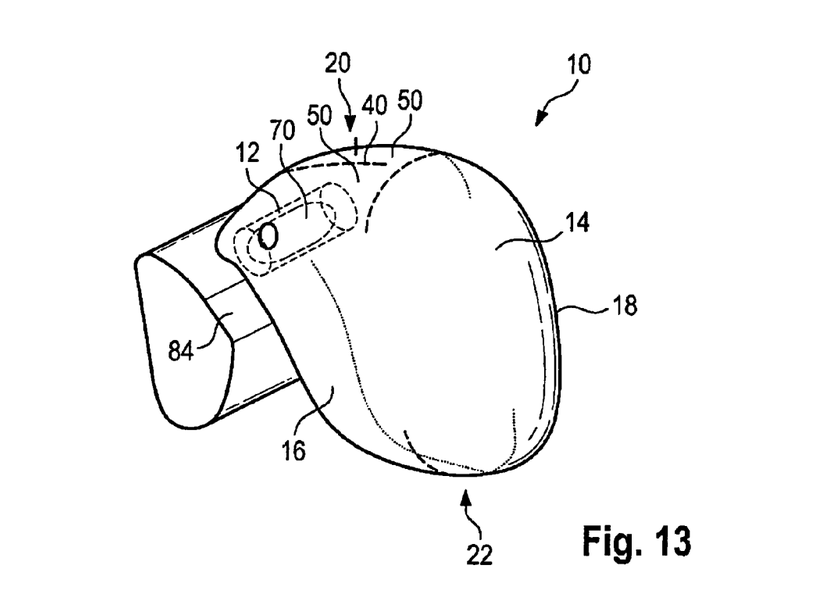
FIG. 13 shows a perspective view of an airbag according to the invention in the inflated state with instrument panel.

In the present embodiment the airbag is formed of a single cloth part the margins of which are laid on top of each other and interconnected by simple folding, as will be described in detail hereinafter. In the FIGS. 12 and 13 the airbag according to FIG. 9 is represented which is slightly different from that of FIG. 1, wherein, for the purpose of illustration, first the airbag according to FIG. 13 is described so as to obtain the comprehension of the cloth portions and cloth parts.

The airbag 10 includes a rear injection orifice 12 as well as an opposite front wall 14 onto which the occupant impacts. Moreover, two opposed sidewalls 16, 18 which are converted into an upper wall 20 and a lower wall 22 are provided.

These aforementioned walls are formed by the one-piece cloth part according to FIG. 1. According to FIG. 1, the front wall 14 is a centric cloth portion which is connected in one piece to left and right larger cloth portions 24, 26.

The left cloth portion 24 and the right cloth portion 26 serve for forming all other aforementioned walls. From the upper margin 28 and from the lower margin 30 of the front wall 14 the cut and thus the cloth material extends first along the margins 32, 34 upwards and downwards and slants laterally outwards to uppermost and lowermost corner points 36, 38 and from these outwards and inwards along the margins 40, 42 to a V-shaped indentation 44 the margins 46 of which define the injection orifice 12. Each V-shaped indentation 44 thus forms by its margin 46 one half of the injection orifice periphery.

Hereinafter the two cloth portions 24, 26 are divided even more detailed into those portions responsible for determining the individual walls. The upper and lower walls 20, 22 are defined by two respective portions 50, 52. The upper portions 50 (on each cloth portion 24, 26 a portion 50 is located) are sewed to each other at the margins 40 (cf. FIG. 13) just as the portions 52 along the margins 42. By simple folding the margins 40, 42 are positioned on top of each other.

The respective seams along the margins 40, 42 then extend substantially centrally in the longitudinal direction of the vehicle from the front wall in the direction of the injection orifice, as can be seen from FIG. 13.

Between the, roughly spoken, trapezoidal side portions 50, 52 of a cloth portion 24, 26 there is provided a cloth portion defining and forming the sidewalls 16, 18. The individual portions are separated from each other by broken lines for better explanation in FIG. 1.

The manufacture of the airbag according to FIG. 1 is explained hereinafter. First, the cut, i.e. the cloth part, is folded along a central axis, which simultaneously forms an axis of symmetry 60, and is connected along the margins 40, 42, e.g. sewed up, glued or welded. Subsequently, the margins 32 are folded inwards in the arrow direction (again to be realized by simple folding) so that they are located in the corresponding portions of the upper margin 28 of the central portion and are connected to this marginal portion 28. The same is performed with the margins 34 and the margin 30.

As is clearly visible from FIG. 1, the sidewalls 16, 18 have sort of a triangular shape, wherein it has to be emphasized that the wedge formed in the inflated state (seen in the side view) is strongly curved so that a kind of drop shape occurs.

The sidewalls 16, 18 are designed to be seamless. Inside the airbag a tubular gas deflecting means 70 (tubular cloth layer) is provided (FIG. 13) which surrounds an inflator and deflects the inflowing gas laterally outwards. Due to the deflection in the direction of the sidewalls 16, 18, these are directly exposed to hot gas. Since in this area no seams are provided, no additional expenditure on thermal protection is necessary.

The embodiments according to FIGS. 2 to 4 substantially correspond to the embodiment according to FIG. 1 so that hereinafter only the differences have to be discussed.

Figure 2:
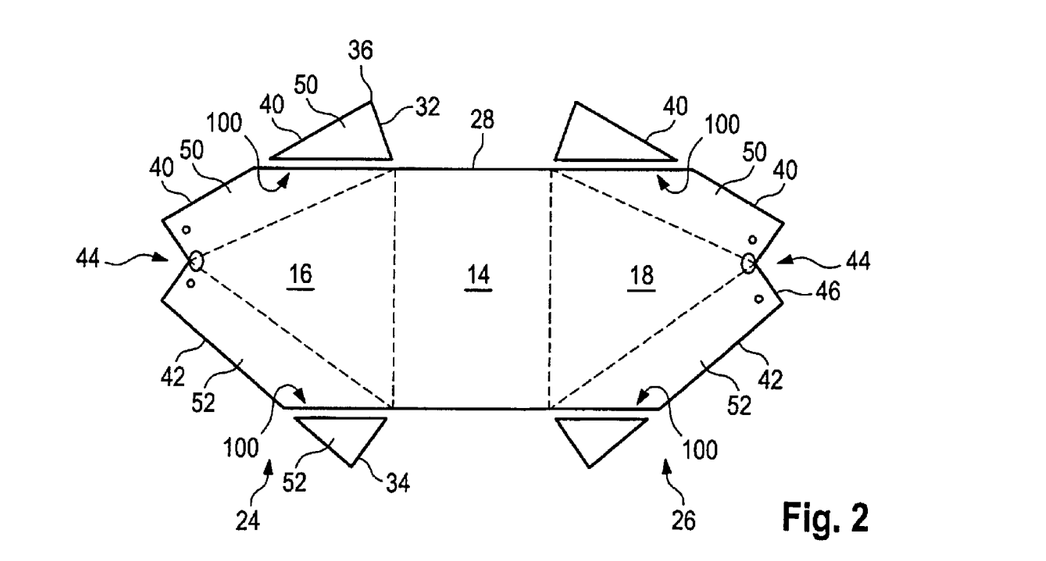
FIGS. 2 to 4 show different embodiments of the cut of the airbag according to the invention on the basis of the embodiment of FIG. 1.

In FIG. 2 it is not one single cloth part which is provided for forming the airbag but it is five cloth parts which first of all are sewed to each other (cf. arrow with seam 100), before the seams already described in connection with FIG. 1 are produced.

In FIG. 2 the upper corners of the side portions 50, 52 are separate parts. This has advantages regarding the cut of the airbag so as to obtain an as low consumption of cloth as possible and a high cloth yield.

Figure 3:
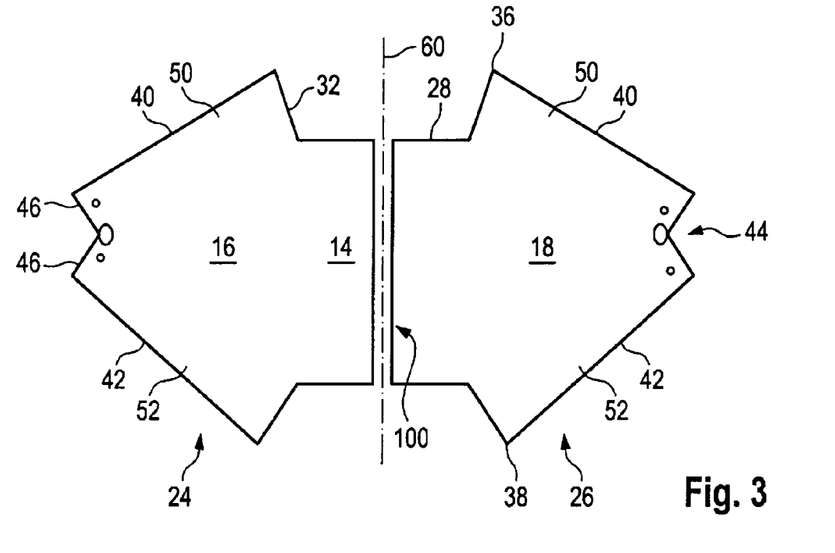

FIG. 3 shows two cloth parts which are first connected to each other along a seam 100, before the seams described in connection with FIG. 1 are produced. The separating line between the cloth parts extends along the axis of symmetry 60.

Figure 4:
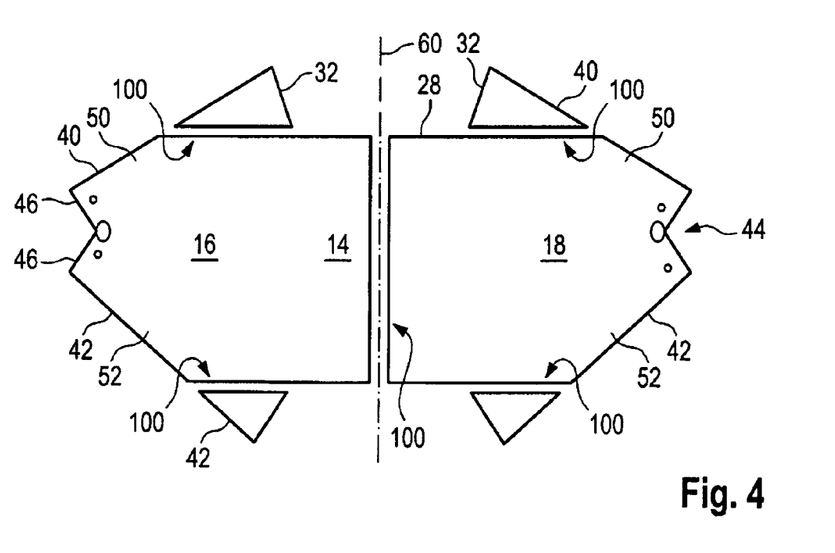

FIG. 4 is a combination of the cuts of the FIGS. 2 and 3, wherein in this case a total of six cloth parts are first composed so that a cloth part according to FIG. 1 is resulting, before the aforementioned seams along the margins are produced.

Figure 5:
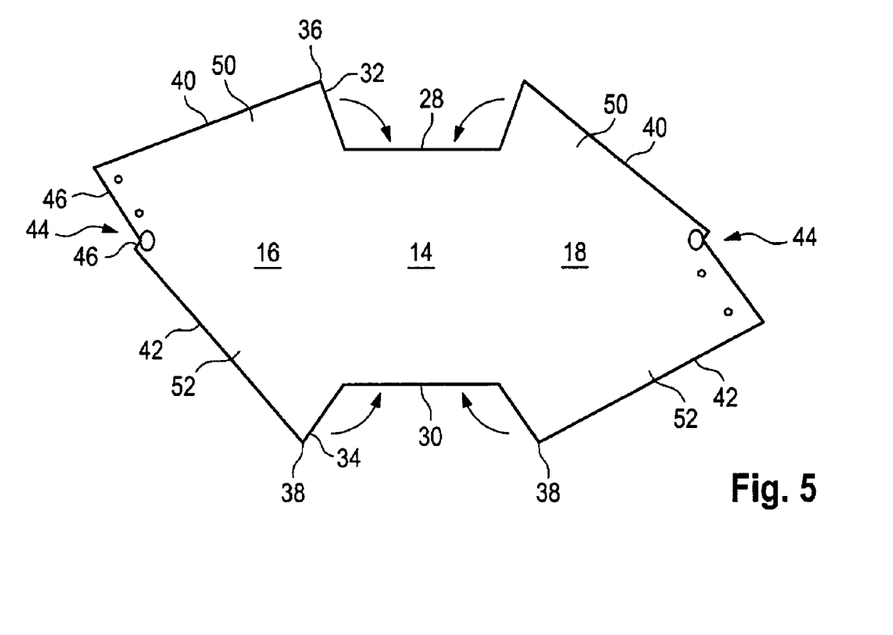
FIG. 5 shows a cut of an airbag according to the invention exhibiting a different outer geometry, in this case as airbag having one single cloth part.
Figure 6:
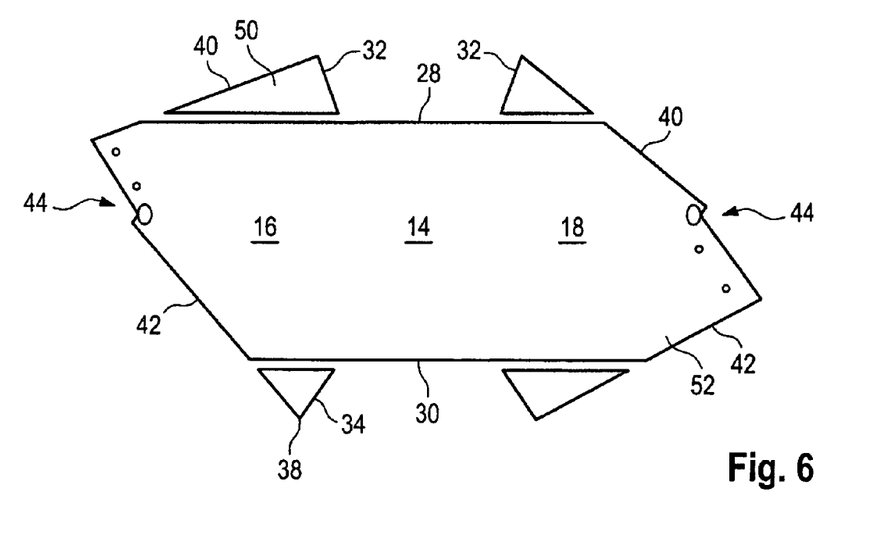
FIGS. 6 to 8 show different variants of the cut of the airbag according to FIG. 5 in the case of a multi-part cut.
Figure 7:
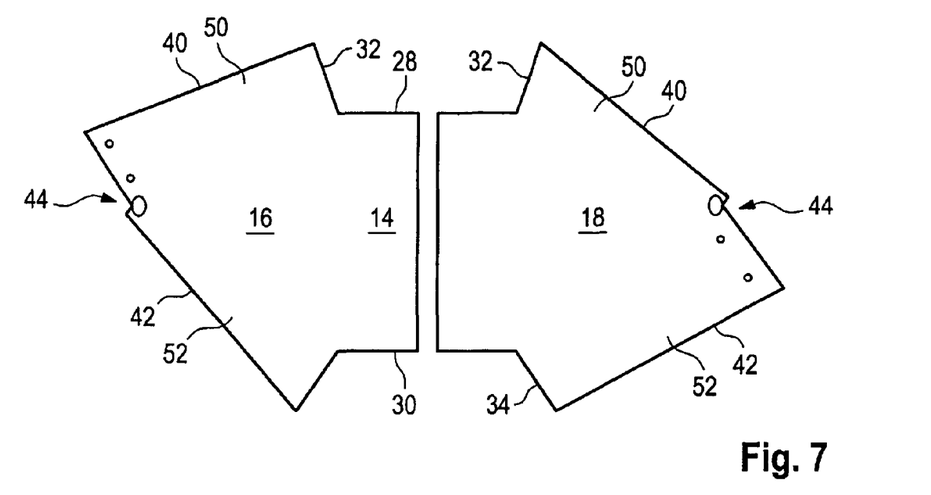
Figure 8:
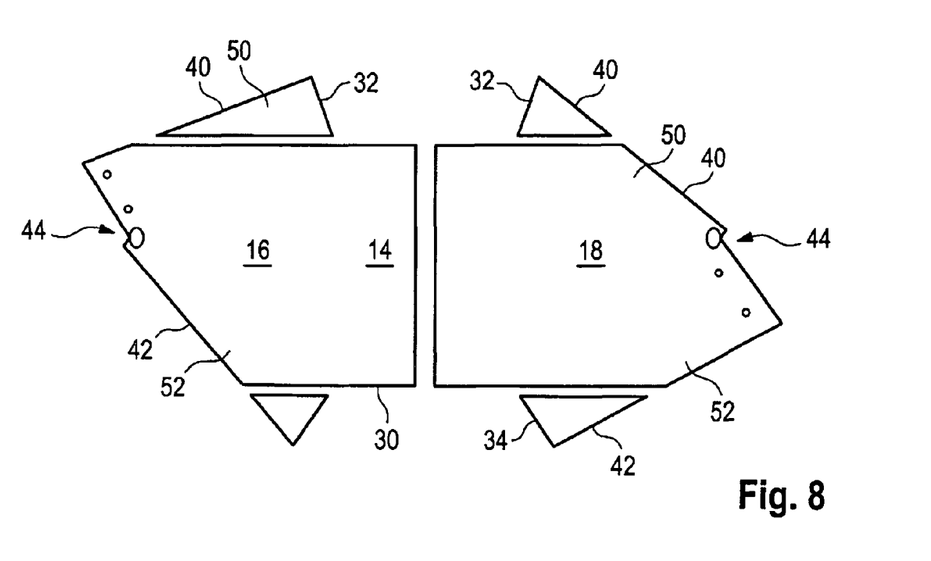

The embodiments according to the FIGS. 5 and 8 substantially correspond to those according to the FIGS. 1 to 4, in this case only a slightly different cloth cut is provided in the area of the side portions 50, 52 and the injection orifice 12 in the area of the indentations 44.

The corresponding portions and margins are provided with the same reference numerals introduced already, however, so that they need not be explicitly discussed in detail any more.

The variants 6 to 8 are then the multi-part variants correspondingly designed concerning the FIGS. 2 to 4.

Whereas in the FIGS. 1 to 8 the margins extend linearly, especially the margins 40, 42 of the side portions 50, in the embodiment according to FIG. 9 these margins 40, 42 are designed to have a gently arched outward curvature so that in this case additional material is provided. The margins 28, 30 of the front wall 14 as well as the margins 32, 34 attached to said margins 28, 30 extend outwardly in arc shape so that in the inflated state outwardly directed bulges are formed.

Thus a rounder geometry is imparted to the airbag. Especially the curvatures 80 at the margins 42 entail the fact that in the inflated state sort of a bulge 82 or step which is directly connected to the front part of the instrument panel 84 is imparted to the airbag (cf. FIG. 12). Such bulge 82 results in the fact that, viewed in a side view of the inflated airbag, an empty space between the instrument panel 84 and the thighs of the average occupant (50 percent dummy) is filled.

The bulge 82 thus largely fills a triangle which is formed, in a side view, between the front of the instrument panel 84 and the thighs.

Also, the bulge 82 entails the fact that the airbag contacts the thighs of the average occupant so that a largely horizontal lower wall portion is formed.

The aforementioned step results from this horizontal wall portion which contacts the thighs and from an upwards slanting portion (cf. FIG. 12) which is backed by the front side of the instrument panel.

The airbag shown in FIG. 12 for the rest is equipped with a very high filling volume of between 70 and 130 liters, preferably 110 liters.

Figure 10:
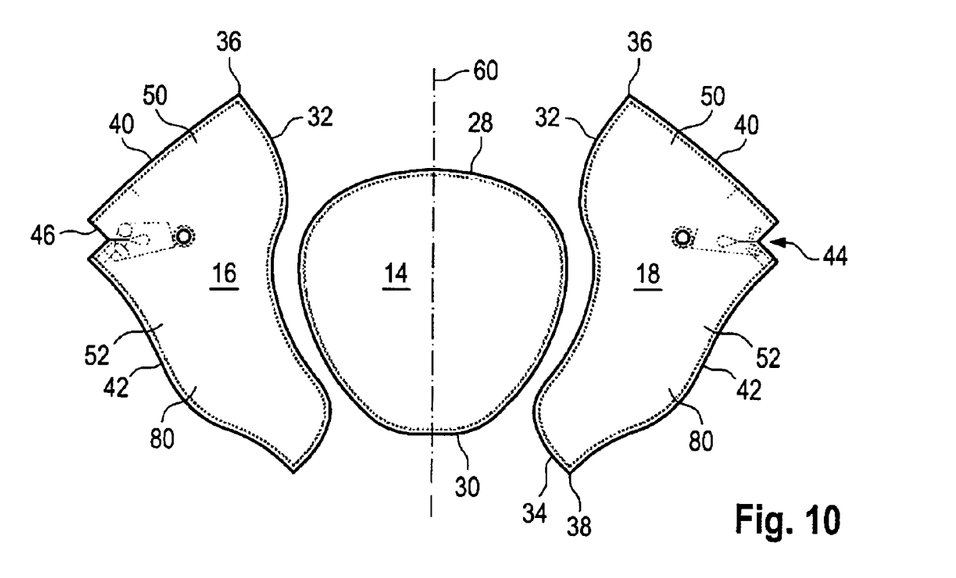
FIG. 10 shows a variant of the cut of the airbag according to FIG. 9, here including several cloth parts.

In the embodiment according to FIG. 10, the airbag is composed of three cloth parts, viz. a central cloth part forming the front wall 14 as well as a left cloth part and a right cloth part forming the side walls 16, 18 and the upper and lower walls 20, 22. In this embodiment the front wall 14 has a substantially circular shape and the other walls are attached thereto in wing shape.

First the two side parts are sewed to the front wall 14 before the aforementioned other margins are sewed to each other.

Figure 14:
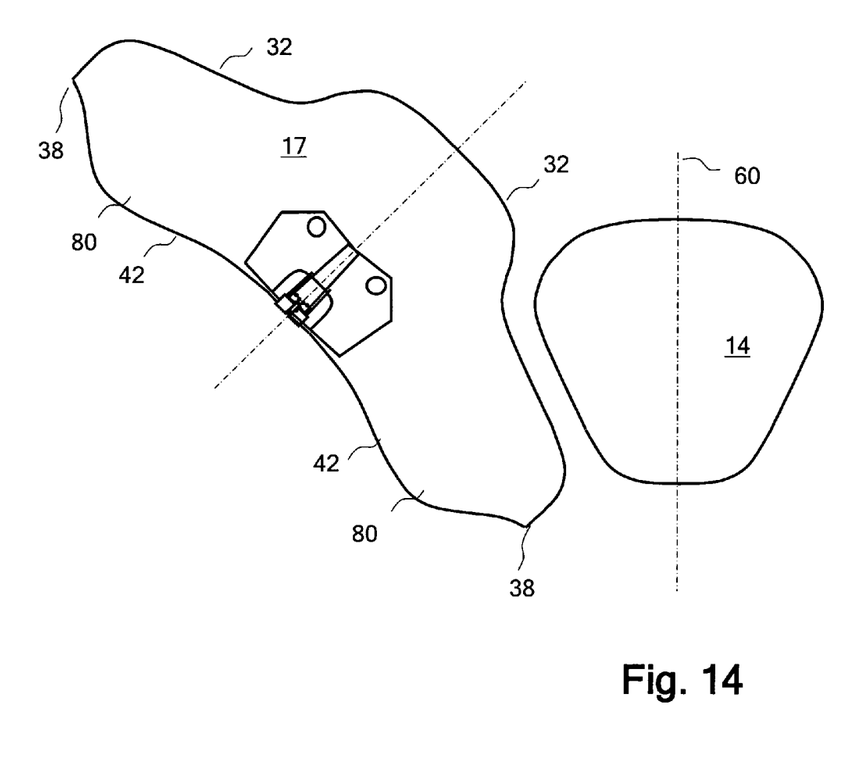
FIG. 14 shows another variant of the cut of the airbag according to FIG. 9, in this case including two cloth parts.

In the embodiment according to FIG. 14 the airbag is composed of two cloth parts, viz. a central cloth part forming the front wall 14 and a cloth part forming the sidewalls 16 and 18 as well as the upper and lower walls 20, 22 in one piece. This one-piece cloth part 17 is mirrored in the example shown here along the axis of symmetry 60, i.e. the two sidewalls 16 and 18 according to the embodiment of FIG. 10 are composed to form one single cloth part in this case. The axis of symmetry 60 corresponds, starting out from the injection orifice, to the course of the two margins 40 of the upper wall 20 now formed in one piece. The lower wall continues to be formed by connecting the two margins 42. Curvatures 80 formed at the margins 42 also in this case result in the fact that a bulge is imparted to the airbag in the inflated state. The two margins are sewed up lying on top of each other between the axis of symmetry 60 and the corner points 38. The funnel- or cone-shaped intermediate component formed in this way is then sewed up with the margin of the front part 14.

In contrast to the embodiment shown here, also the axis of symmetry can extend through the lower wall and the upper wall is formed by sewing up two margins.

Figure 15:
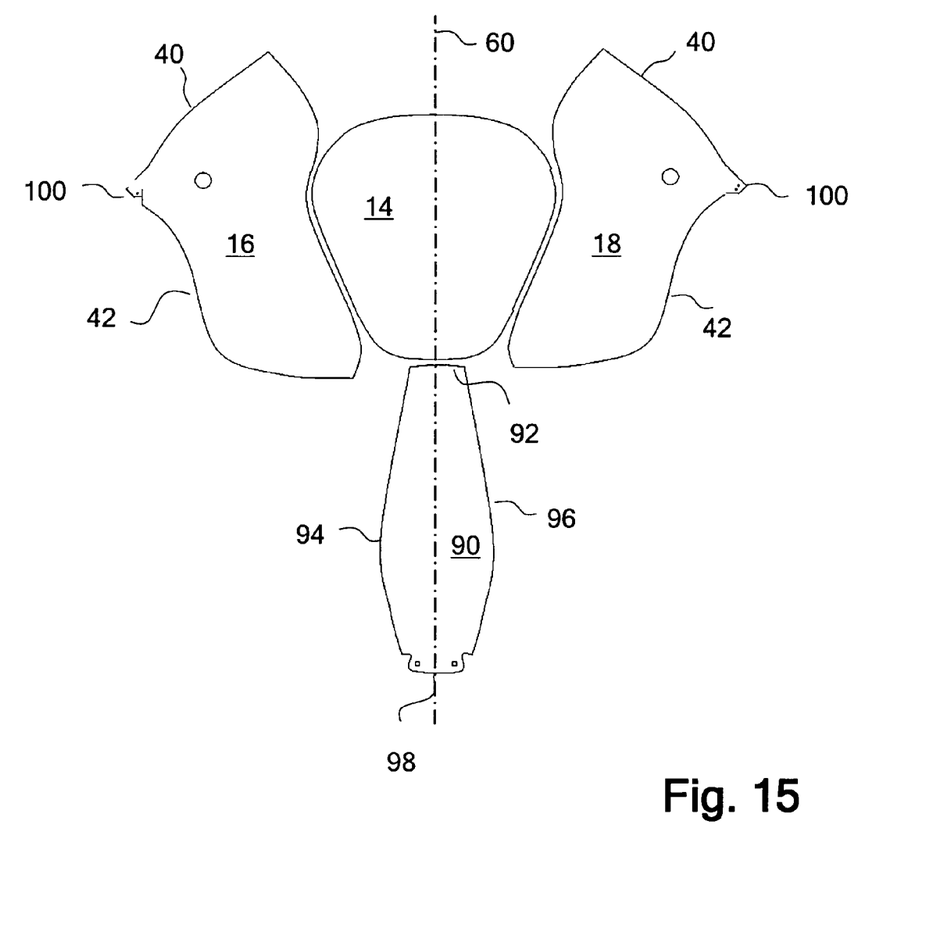
FIG. 15 shows a cut of the airbag according to the invention in accordance with a fourth embodiment, in this case as airbag including four cloth parts.

The embodiment according to FIG. 15 largely corresponds to the embodiment according to FIG. 10 with the difference that an additional fourth piece of cloth 90 is inserted in the lower wall 22. The elongate piece of cloth 90 is sewed by its narrow end face 92 to the lower margin 30 of the front wall 14. The two long side portions 94 and 96 are sewed to the margins 42 of the two sidewalls 16 and 18. The second narrow end face 98 forms the periphery of the injection orifice 12 together with the transitional portions 100 of the margins 40 and 42 of the two sidewalls.

In the embodiments according to the FIGS. 1, 3, 5, 7, 9 and 10 the respective sidewall 16 or 18 together with the side portion 50, 52 which is adjacent to the latter at the top and at the bottom and forms a portion of the upper and lower walls 20, 22 is designed in one piece, i.e. of one single cloth part or cloth portion.

In all embodiments the cut of the airbag is configured such that the cloth portion forming a sidewall 16, 18 and the adjacent upper and lower side portion 50, 52 is tapered toward the injection orifice periphery 46.

The margins 40, 32 as well as 42 and 34, too, are tapered upwards or downwards toward each other. In this case a triangle can be formed which is in the form of a separate cloth part, as illustrated in the FIGS. 2, 4, 6 and 8.

Figure 11:
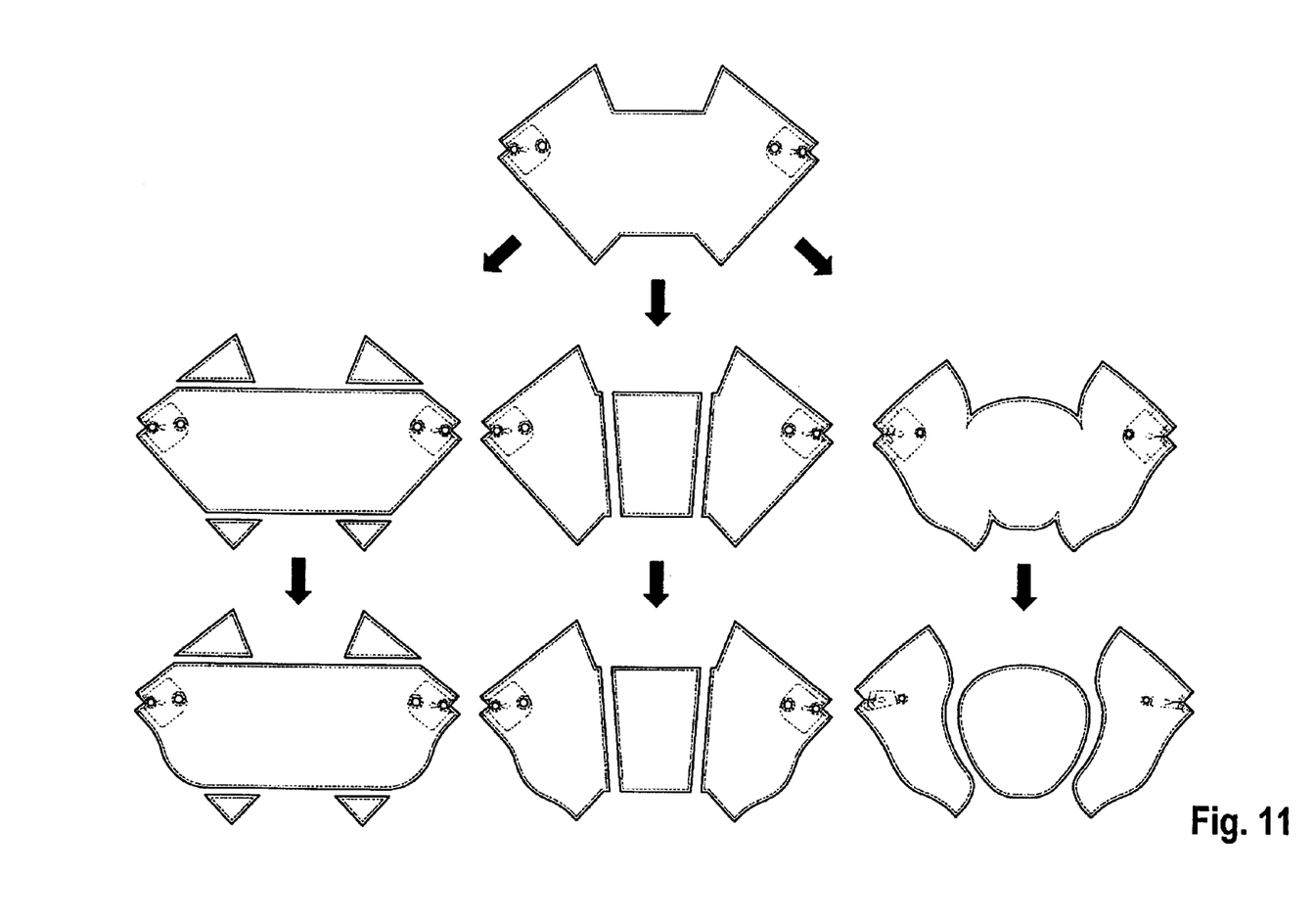
FIG. 11 is a first survey of various options of the cut of the airbag according to the invention.

FIG. 11 shows different variants of the cut of the airbag according to the invention.

The multi-piece design permits to save cloth material, on the other hand more seams have to be provided, as a matter of course.

Figure 161:
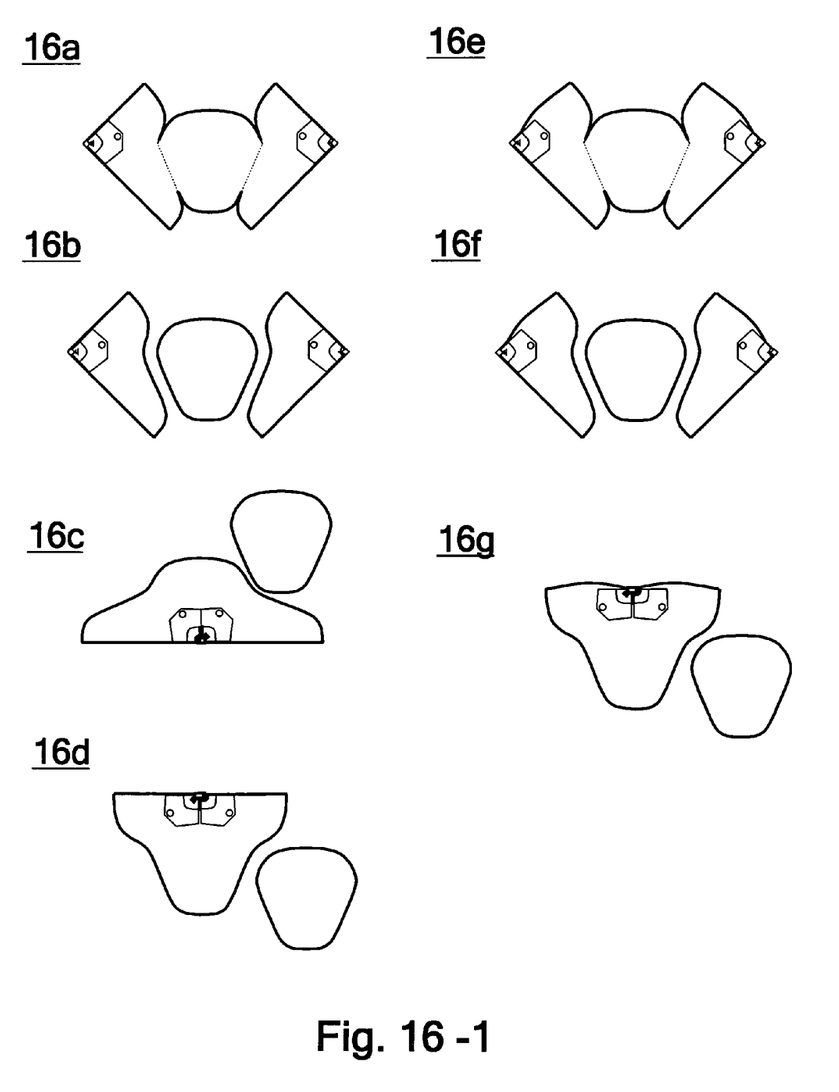
Figure 162:
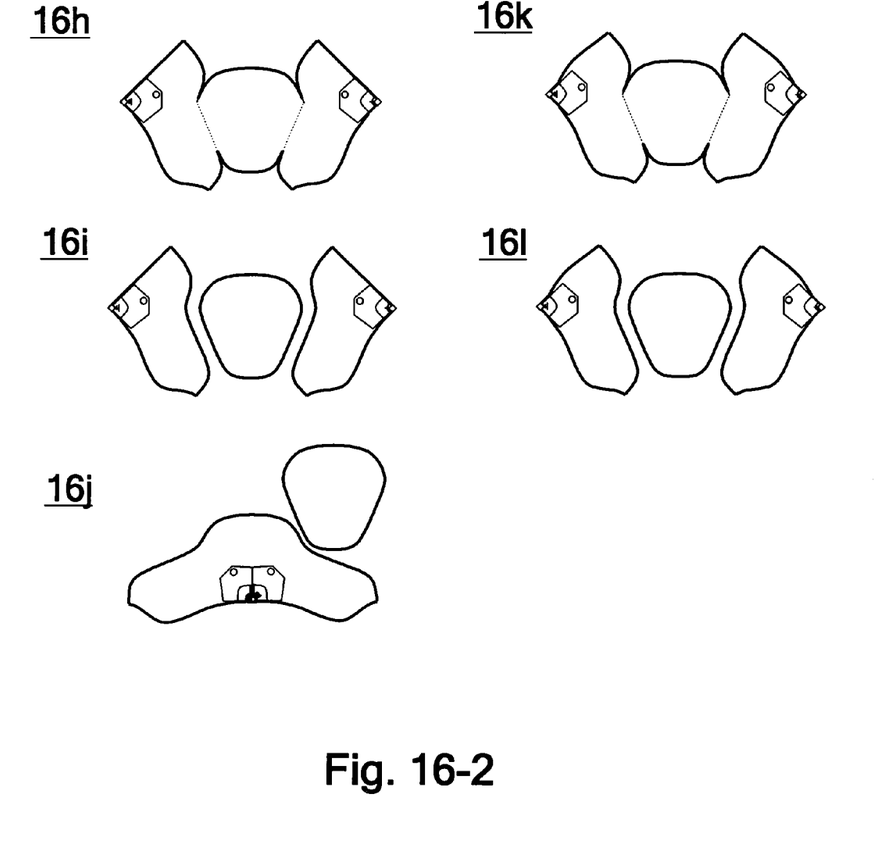

One-piece, three- or two-piece configurations of the cloth cut being based on each other or derived from each other for quasi-identical airbags are represented in the FIGS. 16-1 and 16-2 in the sub-figures 16a to 16l. The respective sub-figures 16a to 16d, 16e to 16g, 16h to 16j and 16k to 16l arranged below each other constitute the respective related cut variants of a quasi-identical airbag.

In the case of the sub-figures 16a to 16d the two-piece cut is designed so that the upper wall (sub-figure 16c) or the lower wall (sub-figure 16d) is formed in one piece. The two portions of the upper and lower walls in the one- or three-piece cut exhibit, as apparent from the sub-figures 16a and 16b, substantially linearly extending margins.

In the case of the cut variants according to the sub-figures 16e to 16g, the lower wall in the two-piece design according to sub-figure 16g is formed in one piece. The two portions of the lower wall have in the one- or three-piece cut, as apparent from the sub-figures 16e and 16f, substantially linearly extending margins. The margins of the upper wall to be connected have a curved design so that a bulge is formed in the sewed state.

In the sequence of cuts according to the sub-figures 16h to 16j, the upper wall in the one- and three-piece design exhibits margins to be connected in a linear manner, which in the case of the two-piece cut according to sub-figure 16j are dispensed with or are produced by weaving. After completion of the airbag a bulge is formed in the lower wall.

In the airbag variant according to the sub-figures 16k and 16l both the upper wall and the lower wall have a bulge. In this case the margins to be connected are not rectilinear but are appropriately curved. Therefore a two-piece cut variant analogously to the previous embodiments does not exist.

The invention claimed is:

1. An airbag, comprising:
  a rear injection orifice (12);
  first and second opposed sidewalls (16, 18), an upper wall (20), and a lower wall (22), the sidewalls (16, 18) the upper wall (20) and the lower wall (22) defined by a single cloth part that includes first and second margins (40, 42) that are connected to one another to form the lower wall (22), the first and second margins (40, 42) having a non-linear configuration when the airbag is in an uninflated, unassembled state, the non-linear configuration selected to shape the lower wall (22) to follow a contour of a front side of an instrument panel when the airbag is viewed from the side in an inflated state; and
  a front wall (14) adapted for impact by an occupant, the front wall (14) being defined by a cloth part that is separate from the single cloth part that defines the sidewalls (16, 18) the upper wall (20) and the lower wall (22).

2. The airbag according to claim 1, wherein the connected margins (40, 42) have an outwardly extending curvature (80) and the airbag has an outwardly directed bulge (82) at at least one of its upper and lower walls (20, 22).

3. The airbag according to claim 2, wherein the bulge (82) is positioned so that it projects into a triangle which is formed, viewed in a side view of the inflated airbag, by the front side of the instrument panel (84) and thighs of an average occupant.

4. The airbag according to claim 2, wherein the bulge (82) is positioned so that it contacts thighs of an average occupant.

5. The airbag according to claim 1, wherein the lower wall (22), viewed in a side view of the inflated airbag, includes two portions, the two portions comprising a largely horizontal portion which contacts thighs of an average occupant and an upwards slanting portion which is backed by the front side of the instrument panel (84).

6. The airbag according to claim 1, wherein the airbag has a filling volume of between 70 and 130 liters.

7. The airbag according to claim 1, wherein the sidewalls (16, 18) are designed to be seamless.

8. The airbag according to claim 1, wherein inside the airbag in the area of the injection orifice (12) a gas deflecting means is provided for deflecting injected gas laterally to the sidewalls (16, 18).

9. The airbag according to claim 1, wherein a cloth part forming the front wall (14) includes at least one of an upper and a lower margin (28, 30) extending in an outwardly curved manner.

10. The airbag according to claim 1, wherein, viewed in the cut of the airbag, side portions (50, 52) of at least one of the upper and the lower wall (20, 22) have a margin (32, 34) which is attached to upper and lower margins (28, 30) of the front wall (14), the margin (32, 34) of the side portions (50, 52) extending preferably outwardly curved and arched.

11. The airbag according to claim 1, wherein a portion of an injection orifice edge (46) is formed at a cloth portion by a V-shaped indentation (44), viewed in the cut of the airbag.

12. The airbag according to claim 1, wherein, viewed in the cut of the airbag, margins (32, 34) of a side portion (50, 52) of at least one of the upper and the lower wall (20, 22), which are attached to upper and lower margins (28, 30) of the front wall (14), and the connected margins (40, 42) are preferably tapered toward each other while forming a triangle.

13. The airbag according to claim 1, wherein the airbag, viewed in the cut of the airbag, includes a centric axis of symmetry (60).

* * * * *